(12) United States Patent
Berry et al.

(10) Patent No.: US 9,540,122 B2
(45) Date of Patent: Jan. 10, 2017

(54) MANEUVER PROCESSING

(71) Applicant: Analytical Graphics Inc., Exton, PA (US)

(72) Inventors: Matthew M. Berry, Glenmoore, PA (US); Douglas E. Cather, Monument, CO (US)

(73) Assignee: ANALYTICAL GRAPHICS INC., Exton, PA (US)

( * ) Notice: Subject to any disclaimer, the term of this patent is extended or adjusted under 35 U.S.C. 154(b) by 192 days.

(21) Appl. No.: 14/521,017

(22) Filed: Oct. 22, 2014

(65) Prior Publication Data

US 2015/0149001 A1 May 28, 2015

Related U.S. Application Data

(60) Provisional application No. 61/909,704, filed on Nov. 27, 2013.

(51) Int. Cl.
*B64G 3/00* (2006.01)
*G01C 21/24* (2006.01)
(Continued)

(52) U.S. Cl.
CPC . *B64G 1/24* (2013.01); *B64G 3/00* (2013.01); *G05D 1/0883* (2013.01); *G01C 21/24* (2013.01)

(58) Field of Classification Search
CPC ..... B64G 2001/245; B64G 1/242; B64G 1/24; B64G 3/00; B64G 1/007; B64G 1/10; B64G 1/1021; B64G 2001/247; G05D 1/0883; G05D 1/10; G05D 1/00; G05D 1/0808; G01C 21/02; G01S 3/7862; G01S 19/40; G01S 19/47; G01S 3/28; G01S 5/0284; G08G 5/065; G08G 5/0008; G08G 5/045; B60K 6/365; F02D 2200/701
See application file for complete search history.

(56) References Cited

U.S. PATENT DOCUMENTS 6,708,116 B2 * 3/2004 Wright .................. B64G 1/242
342/357.68
7,187,320 B1 * 3/2007 Yang ..................... G01S 13/723
342/104

(Continued)

OTHER PUBLICATIONS

Benjamin S. Aaron, "Geosynchronous Satellite Maneuver Detection and Orbit Recovery Using Ground Based Optical Tracking," 2004, May 26, 2006, Department of Aerospace Engineering, MIT.*

(Continued)

*Primary Examiner* — Jerrah Edwards
*Assistant Examiner* — Demetra Smith-Stewart
(74) *Attorney, Agent, or Firm* — The Marbury Law Group, PLLC

(57) ABSTRACT

A computing device may detect that a space object has undergone a maneuver and may attempt to calculate a solution to that maneuver based in part on start and stop times and thrust uncertainties associated with the detected maneuver. However, the computing device may sometimes be unable to calculate an acceptable solution for a detected maneuver given these initial start and stop times and thrust uncertainties. Thus, the various embodiments provide for a computing device and methods implemented by a processor executing on the device for identifying and calculating a recovery maneuver of a space object when an acceptable solution for a detected maneuver cannot be determined. In the various embodiments, a computing device processor may generate a recovery maneuver based on the detected maneuver, and the processor may adjust the start and stop times and the uncertainty values of the recovery maneuver until an acceptable solution is found.

39 Claims, 8 Drawing Sheets

(51) Int. Cl.
*B64G 1/24* (2006.01)
*G05D 1/08* (2006.01)

(56) References Cited

U.S. PATENT DOCUMENTS

| | | | |
|---|---|---|---|
| 8,386,099 B2* | 2/2013 | Carrico, Jr. | B64G 1/242 |
| | | | 701/1 |
| 8,600,676 B2* | 12/2013 | Hwang | B64G 1/24 |
| | | | 701/13 |
| 2004/0006423 A1 | 1/2004 | Fujimoto et al. | |
| 2007/0295855 A1 | 12/2007 | Lam et al. | |
| 2008/0033648 A1 | 2/2008 | Kelly et al. | |
| 2011/0118980 A1 | 5/2011 | Hoy | |
| 2011/0196550 A1 | 8/2011 | Carrico, Jr. et al. | |
| 2012/0046863 A1* | 2/2012 | Hope | B64G 3/00 |
| | | | 701/531 |

OTHER PUBLICATIONS

International Search Report from the Korean Intellectual Property Office in International Application No. PCT/US2014/063418 dated Jan. 12, 2015.

International Preliminary Report on Patentability from the Internatonal Bureau in related International Application No. PCT/US2014/063418 dated May 31, 2016.

* cited by examiner

MANEUVER PROCESSING

CROSS REFERENCE TO RELATED APPLICATIONS

This application claims the benefit of priority to U.S. Provisional Application No. 61/909,704 filed Nov. 27, 2013 entitled "Maneuver Processing," the entire contents of which are hereby incorporated by reference.

BACKGROUND

Interest in varied applications of artificial satellites has steadily increased in recent decades. For example, satellites currently play a substantial role in navigation (e.g., GPS), commerce, communications, scientific research, and national security. In light of the increasing reliance on satellite-based technologies, the ability to locate and monitor the changing position of satellites continues to be an utmost priority to ensure that satellite-based technologies and services operate as intended.

SUMMARY

The systems, methods, devices, and non-transitory media of the various embodiments may enable identifying and calculating a recovery maneuver of a space object when an acceptable solution for a detected maneuver cannot be determined. In the various embodiments, a computing device processor may execute an embodiment method to generate a recovery maneuver based on the detected maneuver, and adjust the start and stop times and the uncertainty values of the recovery maneuver until an acceptable solution is found.

In an embodiment, a method for solving a detected maneuver after entering a recovery mode may include determining an initial start time and an initial stop time for the detected maneuver, generating a recovery maneuver based on the initial start time and the initial stop time, performing a filtering operation on the recovery maneuver to determine a number of rejected residuals, determining whether the number of rejected residuals of the recovery maneuver exceeds a threshold; performing a smoothing operation on the recovery maneuver in response to determining that the number of rejected residuals of the recovery maneuver does not exceed a threshold, determining whether all consistency components of the recovery maneuver are acceptable after performing the smoothing operation, and reporting a solution to the recovery maneuver in response to determining that all consistency components of the recovery maneuver are acceptable.

In an embodiment, a method for solving a detected maneuver after entering a recovery mode may include determining an initial start time and an initial stop time for the detected maneuver, generating a recovery maneuver based on the initial start time and the initial stop time, performing a filtering operation on the recovery maneuver to determine a number of rejected residuals for the recovery maneuver, determining whether the number of rejected residuals exceeds a threshold, performing a smoothing operation on the recovery maneuver to compute a velocity consistency for each direction component of the recovery maneuver in response to determining that the number of rejected residuals does not exceed a threshold, determining whether each consistency component of the recovery maneuver is within a certain tolerance threshold, adjusting values of one or more uncertainties associated with a consistency component that is not within the certain tolerance threshold in response to determining that a consistency component is not within the certain tolerance threshold, repeating the filtering operation, determining whether the number of rejected residuals exceeds a threshold after repeating the filtering operation; repeating the smoothing operation in response to determining that the number of rejected residuals does not exceed a threshold, determining whether each consistency component of the recovery maneuver is within the certain tolerance threshold after repeating the smoothing operation, and reporting a solution to the recovery maneuver in response to determining that all consistency components of the recovery maneuver are acceptable after repeating the smoothing operation.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

A computing device may detect that a space object (e.g., a natural or artificial satellite) has undergone a maneuver (e.g., a change in orbit or trajectory, etc.), and the device may attempt to calculate a solution to that maneuver (i.e., how the space object ended up in the new position, trajectory, or track) based in part on start and stop times and thrust uncertainties associated with the detected maneuver. However, in some circumstances, the computing device may be unable to calculate an acceptable solution for a detected maneuver given these initial start and stop times and thrust uncertainties.

Thus, in overview, the various embodiments provide for a computing device and methods implemented by a processor executing on the device for identifying and calculating a recovery maneuver of a space object when an acceptable solution for a detected maneuver cannot be determined based on an initial start and stop time and initial uncertainty values. In the various embodiments, a computing device processor may generate a recovery maneuver based on the detected maneuver, and the processor may adjust the start and stop times and the uncertainty values of the recovery maneuver until an acceptable solution can be found.

Figure 1:
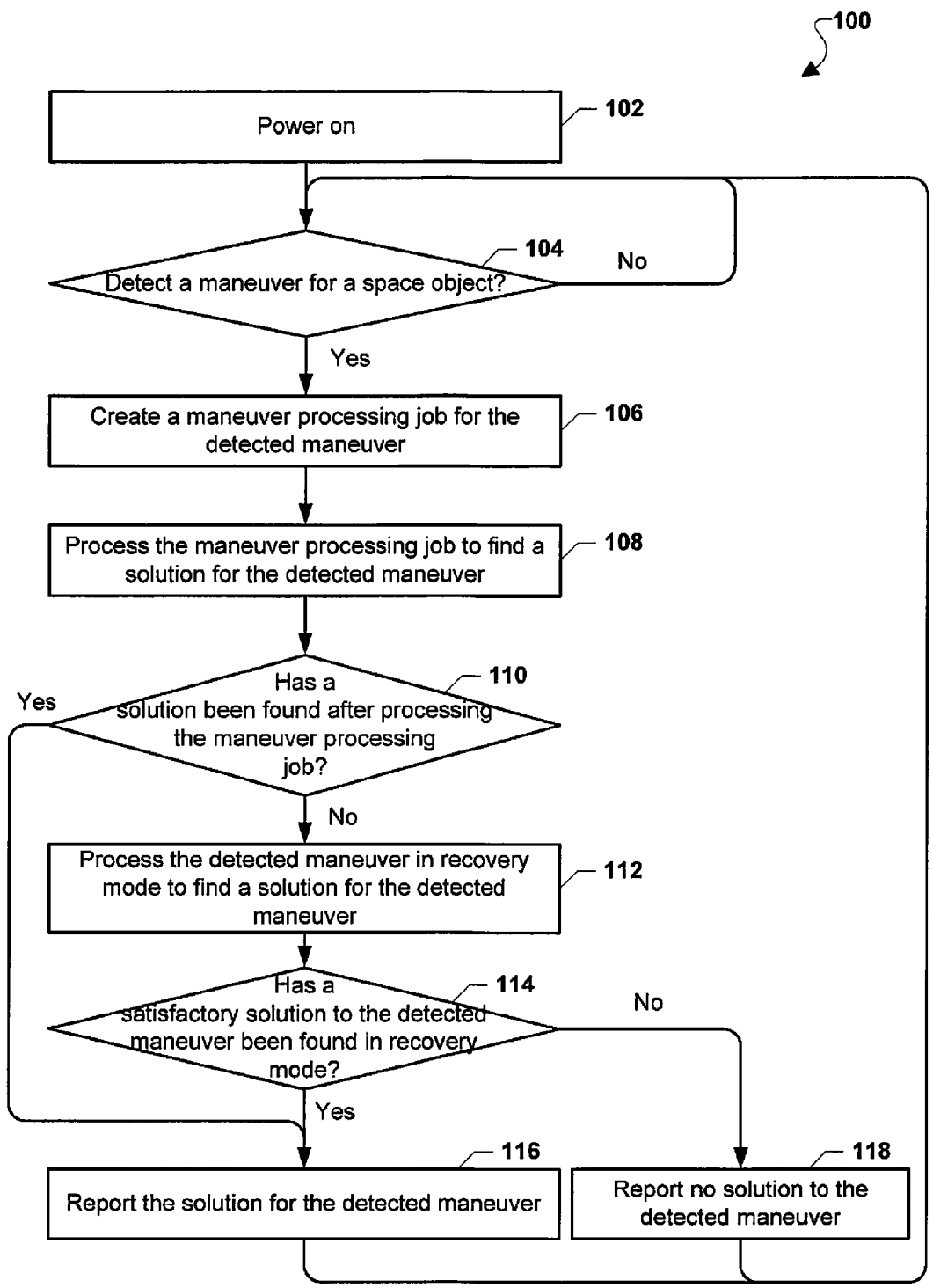
FIG. 1 is a process flow diagram illustrating an embodiment method for determining a solution to a detected space object maneuver.

FIG. 1 illustrates an embodiment method 100 that may be implemented by a processor of a computing device for determining a solution to a detected maneuver of a space object. In an embodiment, the computing device processor may begin performing the operations of method 100 in response to powering on in block 102.

In determination block 104, the computing device processor may determine whether a maneuver for a space object has been detected. In an embodiment, a space object's maneuver may have occurred gradually (e.g., over the course of several days) and may be characterized by a new and/or unexpected orbit. In a further embodiment, the space object's overall maneuver may be a result of more than one maneuver. For example, in the case of an artificial satellite with its own propulsion system, the artificial satellite may have fired its propulsion system one or more times, thereby putting the satellite in an unexpected or incorrect orbit. When the computing device processor determines that a maneuver for a space object is not detected (i.e., determination block 104="No"), the processor may continually repeat the operations of determination block 104 until a maneuver for a space object is detected.

When the computing device processor determines that a maneuver for a space object is detected (i.e., determination block 104="Yes"), the processor may create a maneuver processing job for the detected maneuver in block 106. In an embodiment, a maneuver processing job may include various data, statistics, start and end times, and other information regarding the tracks (e.g., orbit or path of movement) of the space object.

The computing device processor may also process the maneuver processing job in block 108 to find a solution for the detected maneuver. In other words, the computing device processor may use the various characteristics, data, and other information gathered about the detected maneuver to determine how the space object ended up in its current track, position, etc. For example, the computing device processor may attempt to determine whether an artificial satellite fired its propulsion system at a certain point in a previous track, thereby resulting in a new track.

In an embodiment of the operations of block 108, the computing device processor may run through two phases to characterize the maneuver processing job: pattern recognition, in which initial maneuver guesses are found by postulating maneuvers and testing them against a residual-space metric, and solution refinement, in which these initial guesses are refined with a Nelder-Mead algorithm using a state-space objective function metric. The computing device processor may also run filtering and smoothing operations and may measure four indicators of the quality of the space object's orbit determination fit: position consistency, velocity consistency, residual ratios, and the number of rejected observations.

The computing device processor may also determine whether a solution (e.g., an objective function value within a given threshold) has been found after processing the maneuver processing job in determination block 110. In an embodiment, the processor may determine whether a satisfactory maneuver solution has been found after performing pattern recognition and refinement phases operations as described above with reference to block 108. When the computing device processor determines that a solution has been found after processing the maneuver processing job (i.e., determination block 110="Yes"), the processor may report the solution for the detected maneuver in block 116.

When the computing device processor determines that a satisfactory solution has not been found after processing the maneuver processing job (i.e., determination block 110="No"), the processor may process the detected maneuver in a recovery mode to find a solution for the detected maneuver in block 112. In an embodiment, by entering recovery mode, the computing device processor may generate a long duration maneuver (i.e., a "recovery maneuver") with a high thrust component uncertainty in a further attempt to find a maneuver that fits the observations of the space object. In other words, the computing device processor may extend the start time, stop time, and/or the thrust uncertainty until an acceptable recovery solution is found as noted above. In various embodiments, the processor of the computing device may perform operations of method 100 described above in conjunction with one or more of the operations of methods 200, 300, and/or 400 described below with reference to FIGS. 2-4B to process the detected maneuver in recovery mode.

In determination block 114, the computing device processor may determine whether a satisfactory solution to the detected maneuver been found in recovery mode. In an embodiment, a satisfactory solution may occur when the number of rejected residuals is within an acceptable value or threshold and when consistency values associated with filtering and smoothing operations are within an acceptable range. When the computing device processor determines that there is no satisfactory solution found in recovery mode (i.e., determination block 118="No"), the processor may report that there is no solution to the detected maneuver in block 118. When the computing device processor determines that there is a satisfactory solution to the detected maneuver found in recovery mode (i.e., determination block 114="Yes"), the processor may report the solution for the detected maneuver in block 116.

In an embodiment, after reporting either that a solution has been found in block 116 or that no solution has been found in block 118, the process may continue in a loop starting in determination block 104 to determine a solution to a next detected maneuver of the space object.

Figure 2:
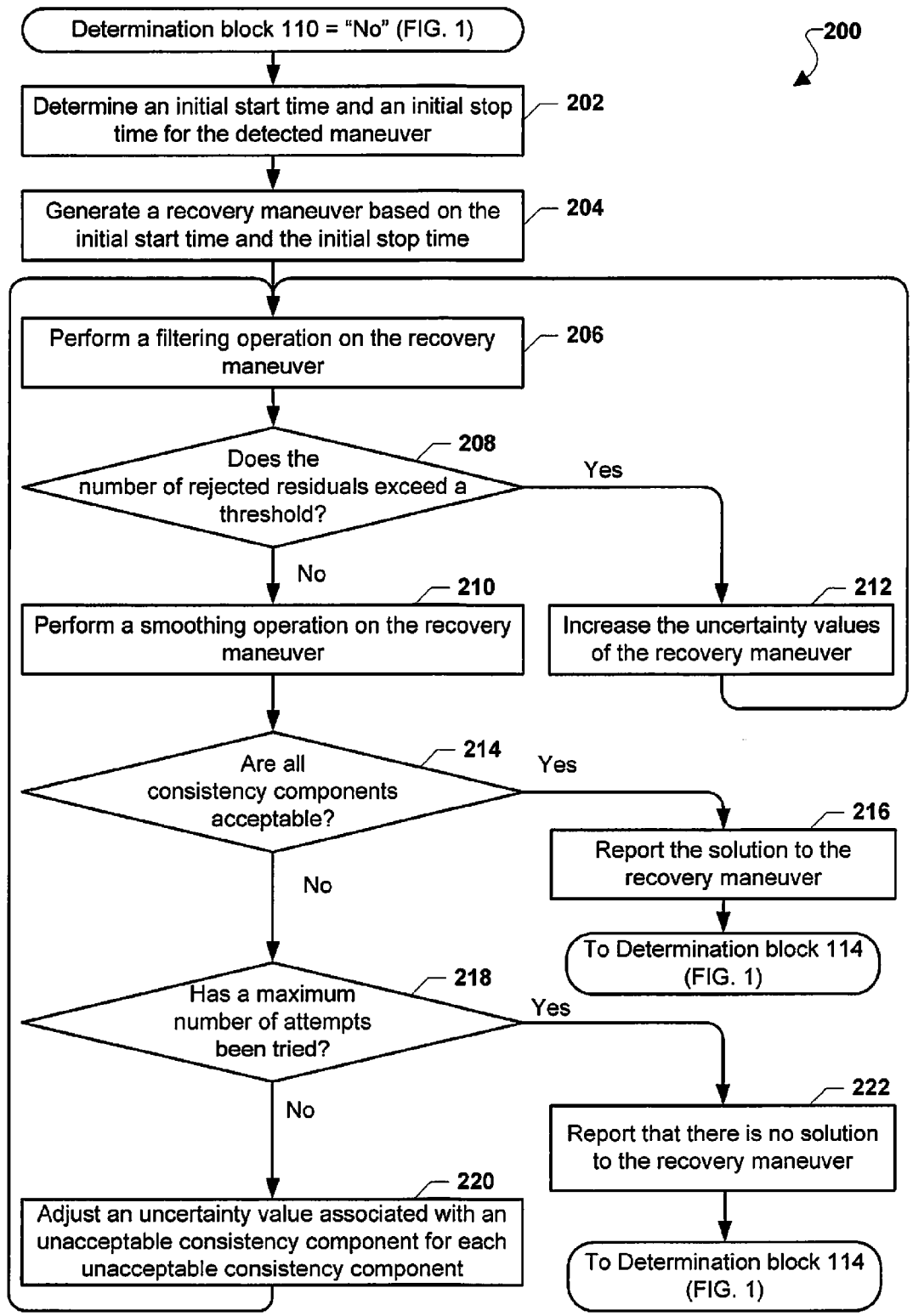
FIG. 2 is a process flow diagram illustrating an embodiment method for determining a solution to a recovery maneuver.

FIG. 2 illustrates an embodiment method 200 that may be implemented by a processor of a computing device for determining whether a satisfactory solution may be found for a maneuver while in recovery mode. The operations of method 200 implement an embodiment of the operations of block 112 of method 100 described above with reference to FIG. 1. Thus, the operations of method 200 may begin in response to the computing device processor's determination that a satisfactory solution has not been found after processing the maneuver processing job (i.e., determination block 110="No").

In block 202, the computing device processor may determine an initial start time and an initial stop time for the detected maneuver. In an embodiment, the computing device processor may progressively expand the time period it analyzes to find a satisfactory solution for the detected maneuver for a space object. The process of determining an initial start time and an initial stop time for the detected maneuver is described in further detail below with reference to FIGS. 3A-3B. In block 204, the computing device processor may also generate a recovery maneuver for the space object based on the initial start time and the initial stop time determined in block 202.

In an embodiment, a recovery maneuver may be a new, constant thrust, finite maneuver. Further, the frame of a recovery maneuver may be Gaussian (RIC), and the thrust specification may be by component with the thrust components all set to zero. In a further embodiment, the recovery maneuver may be associated with values for various uncertainties, such an initial radial uncertainty, an initial in-track uncertainty, and an initial cross-track uncertainty. In another embodiment, in the case in which a "DecrementMass" variable (i.e., a flag the computing device processor may reference to determine whether to decrement the fuel mass value of the space object) is set to false, the processor may set the recovery maneuver to have a mass loss based on a mass flow rate in which the mass flow rate is equal to zero. Otherwise, when the "DecrementMass" flag is set to true, the computing device processor may set the recovery maneuver to have a mass loss based on Isp (i.e., a specific impulse the processor may use to model the recovery maneuver and expressed in seconds).

In another embodiment, when the recovery maneuver is in a data stream, the computing device processor may set the half-life of the component uncertainty to a value related to a stream half-life. In an alternative embodiment in which the recovery maneuver is not in a data stream, the computing device processor may instead set the half-life of the component uncertainty to a value related to an arc half-life.

In block 206, the computing device processor may perform a filtering operation on the recovery maneuver, and the processor may determine whether the number of rejected residuals is over a threshold number in determination block 208. When the computing device processor determines that the rejected number of residuals exceeds the threshold (i.e., determination block 208="Yes"), the processor may increase the uncertainty values of the recovery maneuver in block 212. The process may continue in a loop starting in block 206 as the computing device processor may continuing performing filtering operations on the recovery maneuver until the number of rejected residuals does not exceed the threshold.

When the computing device processor determines that the number of rejected residuals does not exceed the threshold (i.e., determination block 208="No"), the processor may perform a smoothing operation on the recovery maneuver in block 210 to calculate the velocity consistency for each direction component of the recovery maneuver.

In determination block 214, the computing device processor may determine whether all consistency components are acceptable. When the computing device processor determines that all consistency components are acceptable (i.e., determination block 214="Yes"), the processor may report the solution to the recovery maneuver in block 216. In other words, after performing filtering and smoothing operations, the computing device processor may determine that there is a satisfactory solution to the recovery maneuver when the recovery maneuver passes both the residual test in determination block 208 and the consistency test in determination block 214. The computing device processor performing operations of method 200 may then perform the operations in determination block 114 of method 100 described above with reference to FIG. 1.

When the computing device processor determines that all consistency components for the recovery maneuver are not acceptable (i.e., determination block 214="No"), the processor may also determine whether a maximum number of attempts have been tried in determination block 218. In an embodiment, the computing device processor may only attempt to identify a satisfactory solution a certain number of times. When the computing device processor determines that the maximum number of attempts have been tried (i.e., determination block 218="Yes"), the processor may report that there is no solution to the recovery maneuver in block 222. The computing device processor performing operations of method 200 may then perform the operations in determination block 114 of method 100 described above with reference to FIG. 1. When the computing device processor determines that the maximum number of attempts have not been tried (i.e., determination block 218="No"), the processor may adjust one or more uncertainties associated with an unacceptable consistency component for each unacceptable consistency component in block 220.

In an embodiment, the process may continue in a loop starting in block 206 as the computing device processor may continue performing filtering and smoothing operations until either a maximum number of attempts have been tried (i.e., determination block 218="Yes") or until all consistency components of the recovery maneuver are acceptable (i.e., determination block 214="Yes").

Figure 3A:
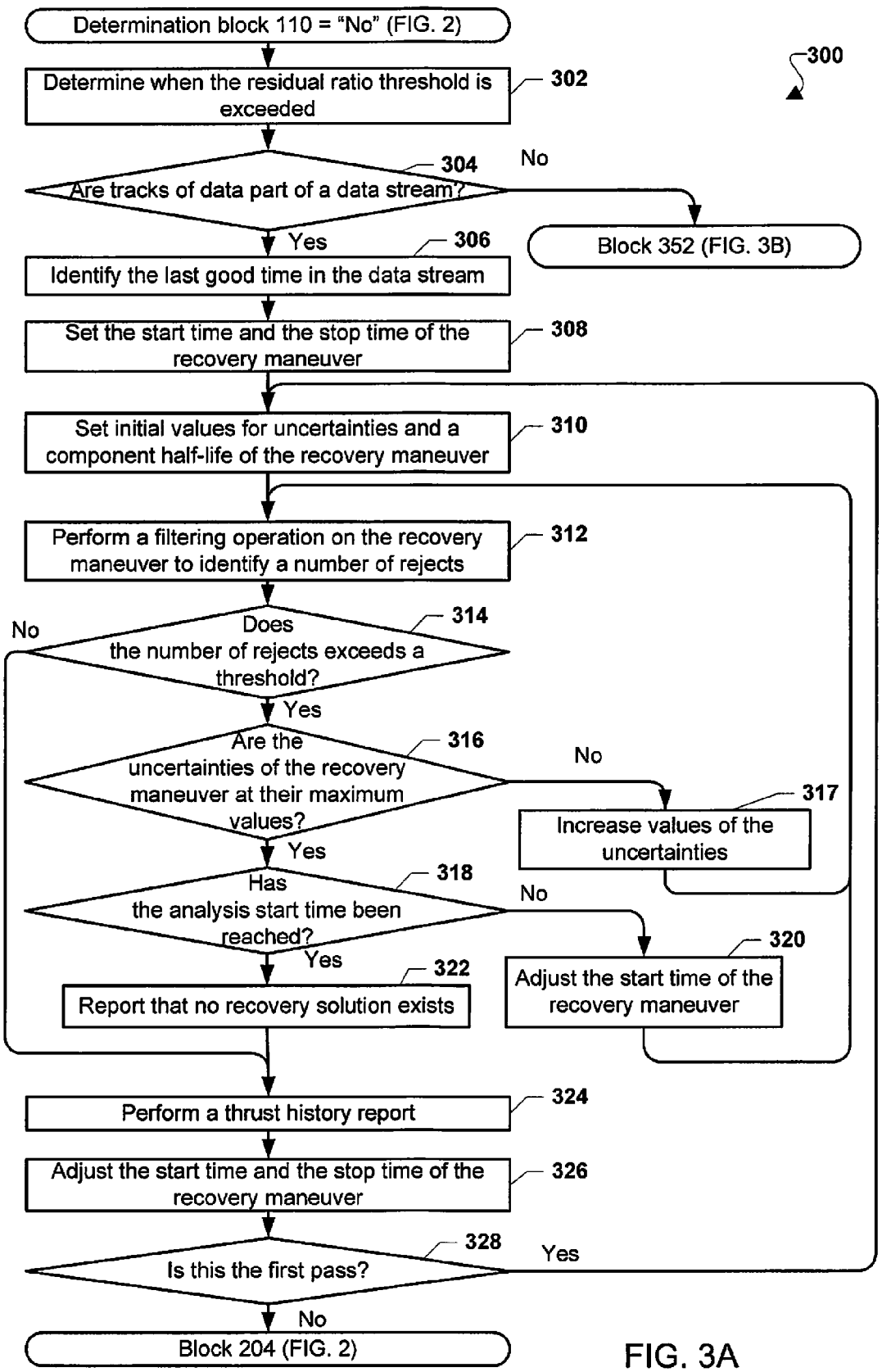
FIGS. 3A and 3B are process flow diagrams illustrating an embodiment method for determining a start time and a stop time for a recovery maneuver.
Figure 3B:
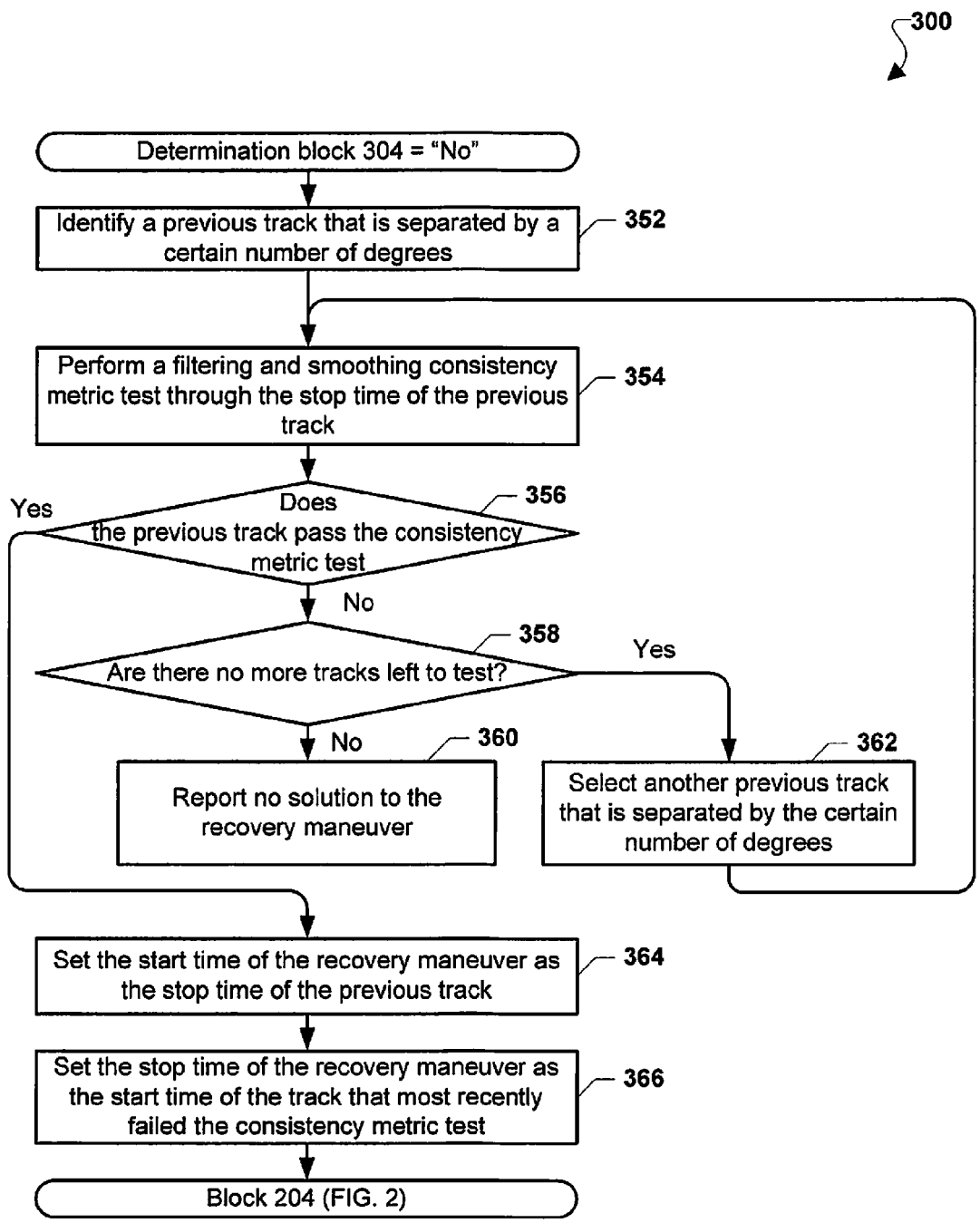

FIGS. 3A and 3B illustrate an embodiment method 300 that may be implemented by a processor of a computing device for determining the start time and the stop time for a detected maneuver. The operations of the method 300 implement embodiments of the operations of block 202 of method 200 described above with reference to FIG. 2. As discussed above, the computing device processor may determine an initial start and stop time for a recovery solution in order to properly adjust/extend those times until an acceptable recovery solution is found.

As illustrated in FIG. 3A, the embodiment method 300 includes operations for determining the start and stop time of a detected maneuver when the tracks of data related to a space object are included within a data stream. The computing device processor may begin performing the operations of the method 300 in response to determining that a solution has not been found after processing the maneuver processing job (i.e., determination block 110="No") as described above.

In block 302 (FIG. 3A), the computing device processor may determine when the residual ratio threshold is exceeded. In an embodiment, for tracks of data that are not part of a data stream, the residual ratio threshold may be exceeded at the start time of the earliest track that has an average residual ratio above the residual ratio threshold. In an alternative embodiment, for tracks of data included in data streams, the computing device processor may determine that the residual ratio has been exceeded at the beginning of the earliest window of data that has a residual ratio average above the threshold. For example, each data window may span a certain number of degrees (e.g., fifteen), and the window span may be extended when there are fewer than a certain number of data points (e.g., three) in the window.

In determination block 304, the computing device processor may determine whether the tracks of data are included as part of a data stream because the process may need to perform different operations to determine the initial start time and stop time of the recovery maneuver based on this determination. When the computing device processor determines that the tracks of data are not part of a data stream (i.e., determination block 304="No"), the process may continue in block 352 of FIG. 3B.

When the computing device processor determines that the tracks of data are part of a data stream (i.e., determination block 304="Yes"), the processor may identify the last good time in the data stream in block 306, such that the last good time may be the point in the data stream that passes a consistency metric test. In an embodiment, the computing device processor may test the consistency metric at a point that is a certain number of degrees in size (e.g., the window size) and that includes at least a certain number of data points (e.g., a minimum data point size) before the time in which the residual ratio threshold is exceeded. In a further embodiment, when this time would be before the first point in the data stream, the computing device processor may instead use the time of the first point in the data stream.

In another embodiment (not shown), when the computing device processor determines that the first selected point does not pass the consistency metric test, the computing device processor may iteratively test additional points by selecting previous points in the data stream that are a certain number of degrees in size and include a certain number of data points. In a further embodiment, when the computing device processor reaches the first point in the data stream and when the processor determines that the consistency test still does not pass for first point in the data stream, the processor may attempt to determine the initial start and stop times for the recovery maneuver by performing the operations of the method 300 starting in block 352 as described below with reference to FIG. 3B.

When the computing device processor finds a point in the data stream that passes the consistency test, the processor may set the start time of the recovery maneuver based on the last good time and may set the stop time of the recovery maneuver to a last observation time in block 308 (FIG. 3A). In block 310, the computing device processor may also set initial values for the recovery maneuver's uncertainties and component half-life. In an embodiment, the computing device processor may set an initial radial uncertainty value, an initial in-track uncertainty value, and an initial cross-track uncertainty value. The computing device processor may also set the recovery maneuver's component half-life to a stream edge detection half-life value.

In block 312, the computing device processor may perform a filtering operation on the recovery maneuver to identify a number of rejected residuals. The computing device processor may also determine whether the number of rejected residuals exceeds a certain threshold in determination block 314. When the computing device processor determines that the number of rejected residuals exceeds a threshold (i.e., determination block 314="Yes"), the processor may determine whether the recovery maneuver's uncertainties are at their maximum values in determination block 316. In an embodiment, the recovery maneuver's uncertainties may have a finite range of values for a given start time and stop time (i.e., a time frame). Thus, when the computing device processor determines that the recovery maneuver's uncertainties are not at their maximum values (i.e., determination block 316="No"), the processor may increase the values of the uncertainties of the recovery maneuver in block 317, and perform another filtering operation on the recovery maneuver using the adjusted uncertainty values in block 312.

When the computing device processor determines that the uncertainties of the recovery maneuver are at their maximum values (i.e., determination block 316="Yes"), the computing device processor may determine whether the analysis start time has been reached in determination block 318. In other words, the computing device processor may determine whether it is possible to extend the start time of the recovery maneuver prior to its current value. When the computing device processor determines that the analysis start time has been reached (i.e., determination block 318="Yes"), the processor may report that no recovery solution exists for the recovery maneuver in block 322.

When the computing device processor determines that the analysis start time has not been reached (i.e., determination block 318="No"), the processor may adjust the start time of the recovery maneuver in block 320, such as by moving the start time back by a minimum extension length, and repeat the above operations starting in block 312 until the number or rejects does not exceed a threshold (i.e., until determination bock 314="No").

When the computing device processor determines that the number of rejects does not exceed a threshold (i.e., determination block 314="No") or upon reporting that no recovery solution exists in block 322, the processor may perform a thrust history report on the filter run in which the number of rejects was below the threshold in block 324. Running the thrust history report may identify or determine a period when the thrust is within a threshold of the peak thrust. In block 326, the computing device processor may adjust the start time and the stop time of the recovery maneuver. In an embodiment of the operations of block 326, the computing device processor may use the thrust history report performed on the filter run to adjust the start time and the stop time of the recovery maneuver. For example, the processor may determine the first time in which the thrust magnitude is within a particular threshold percentage (e.g., a stream-edge time magnitude threshold percentage) of the peak magnitude. The computing device processor may also determine the last time in which the thrust magnitude is within the threshold of the peak. The computing device processor may adjust the start time to a certain time before the initial thrust magnitude threshold crossing time, and adjust the stop time to a certain time after the last threshold crossing time. In a further embodiment, the computing device processor may not adjust the start time to a time before the analysis start time, and not adjust the stop time to a time after the last observation time.

In determination block 328, the computing device processor may determine whether this is the first time in which the processor has performed the operations described above. In an embodiment, the processor may utilize a flag, counter, or other indication to determine whether it has performed the operations described above. Thus, when the computing device processor determines that it is executing the first pass (i.e., determination block 328="Yes"), the processor may repeat the above operations using the adjusted start and stop times set in block 326 starting in block 310 by setting the recovery maneuver's uncertainties to their initial values.

When the computing device processor determines that it is not executing the first pass through the above operations (i.e., determination block 328="No"), the processor may continue executing the operations in block 204 of the method 200 described above with reference to FIG. 2.

When the tracks of data related to a space object are not included within a data stream (i.e., determination block 304="No"), the computing device processor may identify a previous track that is separated by a certain number of degrees in block 352 (FIG. 3B) to determine the start and stop time of a detected maneuver. In an embodiment, when the residual ratio threshold is exceeded by a track, the computing device processor may characterize that track as the first bad track. Further, the computing device processor may identify a track prior to the first bad track that is separated from the first bad track by at least certain number of degrees (e.g., five).

The computing device processor may perform a filtering and smoothing consistency metric test through the stop time of the previous track in block 354. In determination block 356, the computing device processor may determine whether the previous track passes the consistency metric test as described above. When the computing device processor determines that the previous track has not passed the consistency metric test (i.e., determination block 356="No"), the processor may determine whether there are any more tracks left to test in determination block 358.

When the computing device processor determines that there are no more tracks left to test (i.e., determination block 358="No"), the processor may report that there is no solution to the recovery maneuver in block 360. In other words, when the computing device processor cannot identify a last good track, there may be no solution to the recovery maneuver. When the computing device processor determines that there are still tracks left to test (i.e., determination block 358="Yes"), the processor may select another previous track that is separated by a certain number of degrees from the previous track in block 362, and the processor may continue performing the operations described above starting in block 354 until the last good track is identified or until there are no tracks left to test.

When the computing device processor determines that the previous track passes the consistency metric test (i.e., determination block 356="Yes"), the processor may set the start time of the recovery maneuver as the stop time of the previous track (which the processor may characterize as the last good track) in block 364. The computing device processor may also set the stop time of the recovery maneuver as the start time of the track that most recently failed the consistency metric test (i.e., the last bad track) in block 366. In another embodiment, when the first bad track identified by the computing device processor is less than a certain number of degrees (e.g., fifteen) from the last good track, the processor may use a minimum duration setting to set the maneuver stop time. The processor may continue executing the operations in block 204 of the method 200 described above with reference to FIG. 2.

Figure 4A:
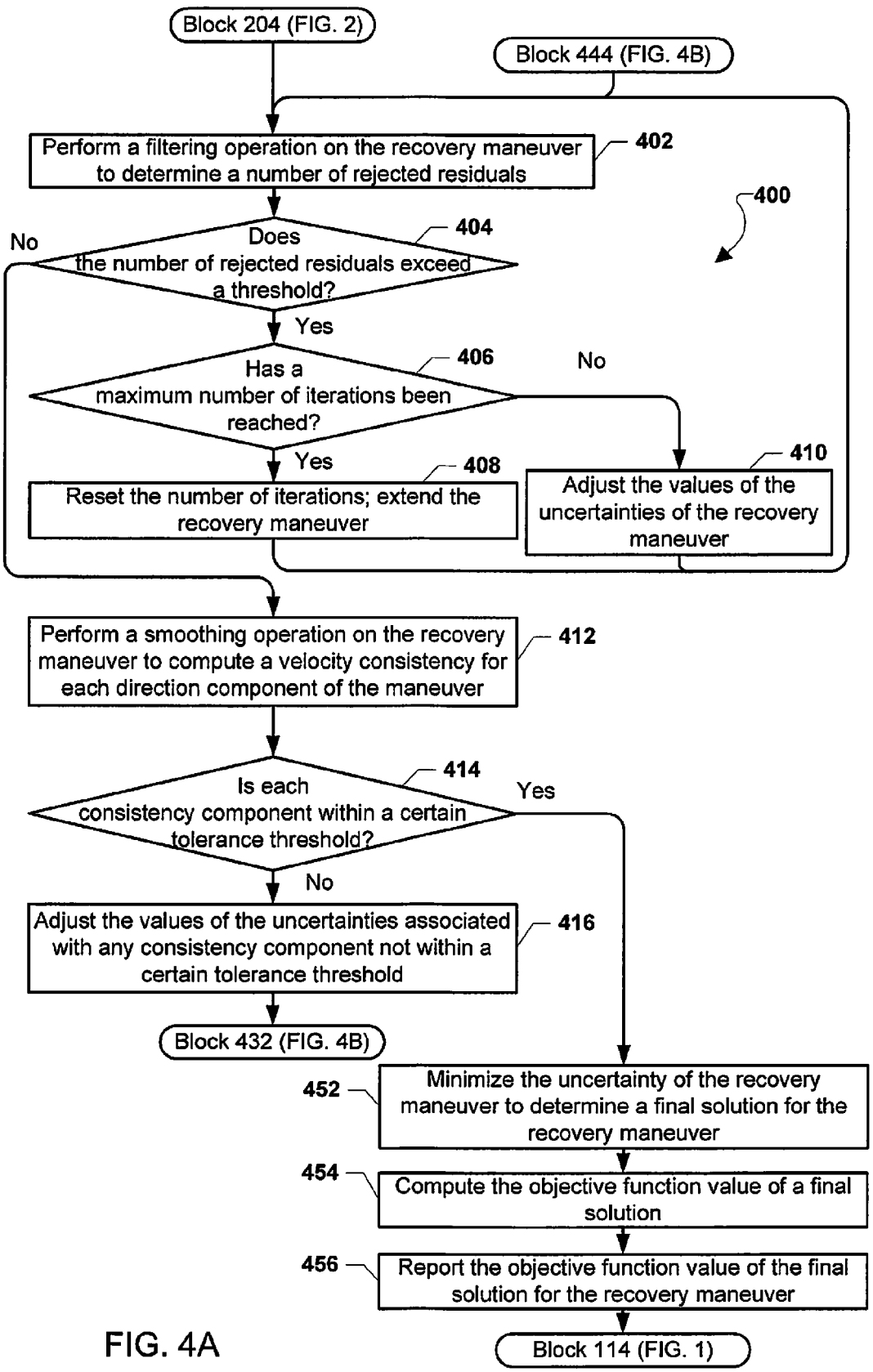
FIGS. 4A and 4B are process flow diagrams illustrating an embodiment method for determining a solution to a recovery maneuver.
Figure 4B:
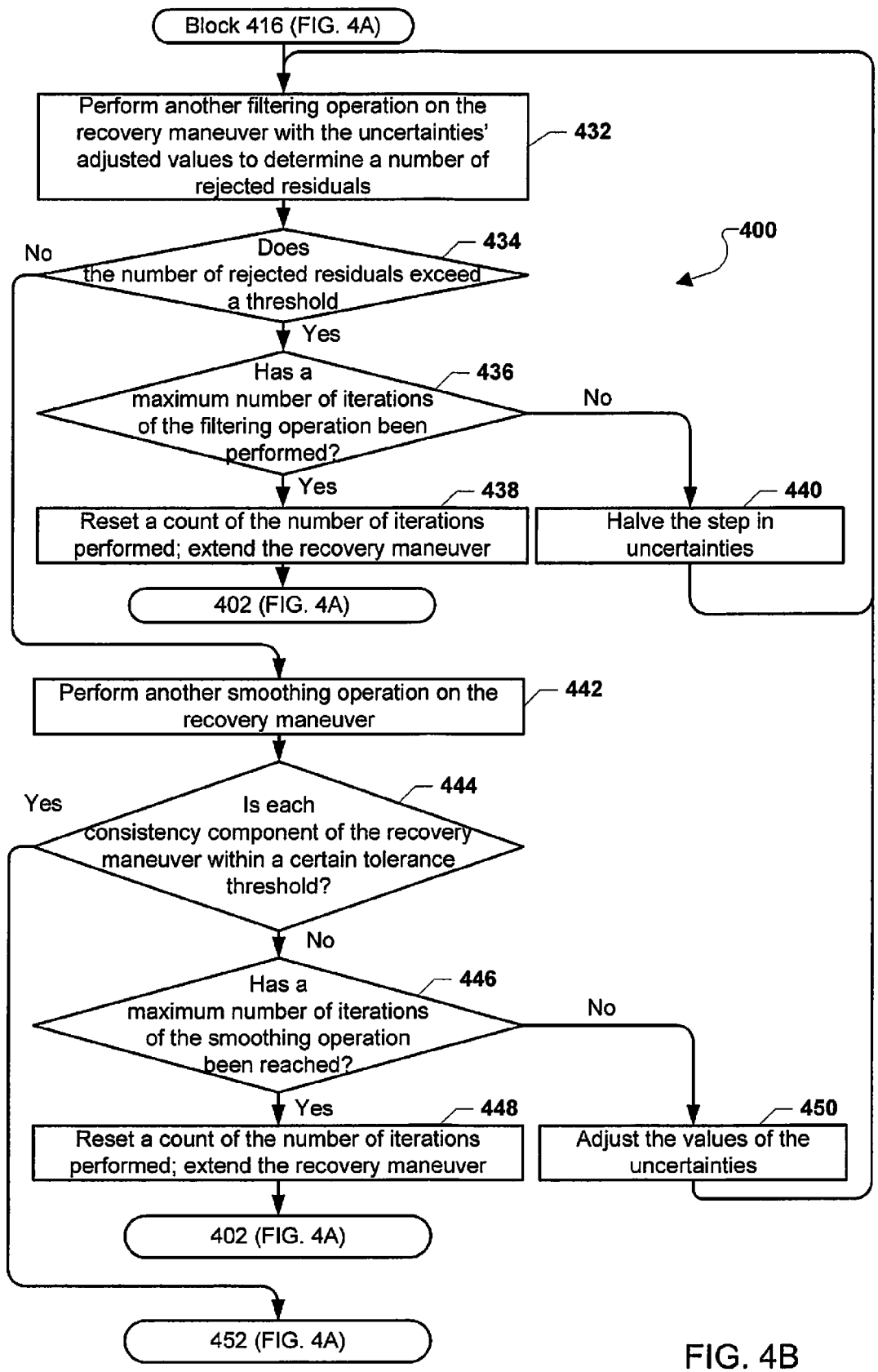

FIGS. 4A and 4B illustrates an embodiment method 400 that may be implemented by a computing device processor for determining a solution to a recovery maneuver. The operations of the method 400 may be performed by the computing device processor as an alternative to the operations of blocks 206-222 of the method 200 described above with reference to FIG. 2 to determine a solution to a recovery maneuver.

As illustrated in FIG. 4A, the computing device processor may begin performing the operations of the method 400 after generating a recovery maneuver based on an initial start time and an initial stop time in block 204 as described above. In block 402, the computing device processor may perform a filtering operation on the recovery maneuver to determine a number of rejected residuals.

In determination block 404, the computing device processor may determine whether the number of rejected residuals determined in block 402 exceeds a threshold. In an embodiment, the threshold may be based on a particular number of rejects or a certain percentage of rejects of the total number of residuals. When the computing device processor determines that the number of rejected residuals exceeds the threshold (i.e., determination block 404="Yes"), the processor may determine whether a maximum number of iterations has been reached in determination block 406. In an embodiment, the computing device processor may keep count of the number of times it has performed a filtering operation on the recovery maneuver as described above with reference to block 402.

When the computing device processor determines that the maximum number of iterations has been reached (i.e., determination block 406="Yes"), the processor may reset the number of iterations and may extend the recovery maneuver in block 408. In an embodiment, the computing device processor may extend the recovery maneuver by adjusting the start time and/or the stop time of the recovery maneuver. In an embodiment, the computing device processor may adjust the start and/or stop times of the recovery maneuver and may reset the counter, flag, or other indication of the number of iterations of the filtering operations that the processor has performed.

In an embodiment, when the recovery maneuver needs to be extended, the way in which the computing device processor extends the recovery maneuver may depend on whether the recovery maneuver is detected in a stream of data as generally described above with reference to FIGS. 3A-3B. When the recovery maneuver is not detected in a data stream, computing device processor may adjust the maneuver stop time to the start time of the next track that starts after the stop time of the track currently being used for the maneuver stop time. In a further embodiment, the computing device processor may require that that next track is at least a certain minimum extension length number of degrees away from the current maneuver stop time.

In an embodiment (not shown), when there are no tracks that are at least a certain minimum extension length number of degrees after the current maneuver stop time, the computing device processor may report that no solution exists for the recovery maneuver. When the computing device processor determines that the maneuver is detected in a data stream, the computing device processor may extend both the maneuver start and stop times by a minimum extension length number of degrees.

In another embodiment, when the computing device processor determines that moving the start time by such an amount would put the start time before the search start time, the computing device processor may set the maneuver start to be the search start time. Similarly, the computing device processor may ensure that the maneuver stop time is bounded by the last observation time.

In another embodiment, when both the maneuver start and stop time are already at the analysis bounds, the computing device processor may report that no solution exists for the recovery maneuver. When the computing device processor determines that the maneuver can be extended, the processor may set the recovery maneuver uncertainties back to their initial values, and the processor may repeat the above operations with the new/adjusted maneuver times.

In an embodiment, in response to extending the recovery maneuver, the computing device processor may also repeat the operations described above starting in block 402.

When the computing device processor determines that the maximum number of iterations has not been reached (i.e., determination block 406="No"), the processor may adjust the values of the uncertainties of the recovery maneuver in block 410. As described above, the recovery maneuver may be associated with one or more uncertainties, such as a radial uncertainty, an in-track uncertainty, and a cross-track uncertainty. In an embodiment, the computing device processor may adjust the uncertainties by calculating partial derivatives of the residual ratio root-mean square (RMS) with respect to each uncertainty. The computing device processor may also increase the uncertainties by the amount that would bring the residual ratio RMS to zero. In another embodiment, when increasing an uncertainty would cause its value to exceed a maximum value, the computing device processor may set that uncertainty's value to the maximum value. In another embodiment, the computing device processor may not adjust an uncertainty when that uncertainty has a partial derivative of zero or when that uncertainty is already at its maximum value. The computing device processor may also repeat the above operations starting by performing a filtering operation on the recovery maneuver in block 402 with the new values for the uncertainties.

When the computing device processor determines that the number of rejected residuals does not exceed a threshold (i.e., determination block 404="No"), the processor may perform a smoothing operation on the recovery maneuver in block 412 to compute a velocity consistency for each direction component of the recovery maneuver. In an embodiment, each consistency component of the recovery maneuver may be required to be within a certain tolerance of a particular setting for a recovery solution to be acceptable. In a further embodiment, a consistency component may also be acceptable when the consistence component is below the lower bound of the above tolerance and when the uncertainty value of the component is at its minimum value (e.g., a minimum radial uncertainty value, minimum in-track uncertainty value, and/or a minimum cross-track uncertainty value).

In determination block 414, the computing device processor may determine whether each consistency component of the recovery maneuver is within the certain tolerance threshold as described above. When the computing device processor determines that one or more consistency components are not within the certain tolerance threshold or otherwise acceptable (i.e., determination block 414="No"), the processor may adjust the values of the uncertainties associated with the consistency component not within the certain tolerance threshold in block 416. In an embodiment, the computing device processor may adjust the uncertainties by calculating a partial derivative of the direction component's velocity consistency with respect to the direction component's uncertainty, and adjust the uncertainty by an amount required to bring the consistence to a desired consistency value. In a further embodiment, the computing device processor may set an uncertainty to its maximum value when the consistence is determined to be too high when the partial derivative is not negative. In another embodiment, the computing device processor may set the uncertainty to its minimum value when the consistency is determined to be too low.

In response to adjusting the values of the uncertainties in block 416, the processor may continue performing the operations in block 432 (FIG. 4B) to another filtering operation on the recovery maneuver using the adjusted values of the recovery maneuver's uncertainties to determine a number of rejected residuals. The computing device processor may also determine whether the number of rejected residuals exceeds a threshold number in determination block 434 in a manner similar to the operations in determination block 404 described above. In other words, the computing device processor may verify that the new values of the uncertainties do not increase the number of rejects over the allowed threshold.

When the computing device processor determines that the number of rejected residuals determined in block 432 exceeds a threshold number (i.e., determination block 434="Yes"), the processor may determine in determination block 436 whether a maximum number of iterations of the filtering operations of block 432 have been performed. In other words, the computing device processor may determine whether it has repeated the filtering operations of block 432 a certain number of times. When the computing device processor determines that the filtering operation has not been performed more than the maximum number of iterations (i.e., determination block 436="No"), the processor may halve the step in the recovery maneuver's uncertainties in block 440, and repeat the operations described above starting in block 432.

When the computing device processor determines that the filtering operations has been performed the maximum number of iterations (i.e., determination block 436="Yes"), the processor may reset the maximum number of iterations and may extend the recovery maneuver in block 438. In an embodiment, the computing device processor may adjust the start and/or stop times of the recovery maneuver and may reset the counter, flag, or other indication of the number of iterations of the filtering operations that the processor has performed. The computing device processor may also repeat the operations described above starting in block 402 (FIG. 4A).

Referring to FIG. 4B, when the computing device processor determines that the number of rejected residuals of the recovery maneuver does not exceed a threshold (i.e., determination block 434="No"), the processor may perform another smoothing operation on the recovery maneuver in block 442. In an embodiment, the operations of block 442 may be similar to those of block 412 described above with reference to FIG. 4A.

In determination block 444 (FIG. 4B), the computing device processor may determine whether each consistency component of the recovery maneuver is within a certain tolerance threshold. In other words, the computing device processor may perform a consistency test as described above. When the computing device processor determines that there are one or more consistency components of the recovery maneuver that is not within the certain tolerance threshold (i.e., determination block 444="No"), the processor may determine whether a maximum number of iteration of the smoothing operation has been reached in determination block 446. As generally described above with reference to determination block 436, the computing device processor may only perform the smoothing operations a certain number of times before it must extend the start and/or stop times of the recovery maneuver. When the computing device processor determines that the smoothing operations have been performed less than the maximum number of iterations (i.e., determination block 446="No"), the processor may adjust the values of the uncertainties of the recovery maneuver in block 450. The computing device processor may repeat the operations described above starting in block 432 by performing another filtering operation based on the uncertainties' adjusted values.

When the computing device processor determines that the smoothing operation has been performed the maximum number of iterations (i.e., determination block 446="Yes"), the processor may reset a count, flag, or other indication of the number of iterations performed and may extend the recovery maneuver in block 448 as described above with reference to blocks 408 and 438. The computing device processor may repeat the operations described above starting in block 402 (FIG. 4A) by performing another filtering operation based on the uncertainties' adjusted values.

When each consistency component of the recovery maneuver is within a certain threshold (i.e., determination blocks 414 (FIG. 4A) or 444 (FIG. 4B)="Yes"), the computing device processor may minimize the uncertainty of the recovery maneuver in block 452 (FIG. 4A). In an embodiment of the operations of block 452, the computing device processor may perform a bisection search for each direction component—starting with the component with the smallest solved-for thrust values—between a minimum uncertainty and the uncertainty of the converged maneuver. In a further embodiment, this search may enable the computing device processor to determine the minimum uncertainty that passes the residual test (i.e., determination block 434) and the consistency test (i.e., determination block 444). In another embodiment, these minimum acceptable uncertainties are used as the final solution for the recovery maneuver.

In block 454, the computing device processor may compute an objective function value of the final solution. In an embodiment, the computing device processor may also determine the peak thrust times for each maneuver direction component using the solved-for thrust acceleration values determined during the smoothing operations. The computing device processor may also integrate these thrust accelerations to produce effective delta-V values for each maneuver direction component.

In block 456, the computing device processor may report the final solution for the recovery maneuver and perform the operations in block 114 of the method 100 described above with reference to FIG. 1.

Figure 5:
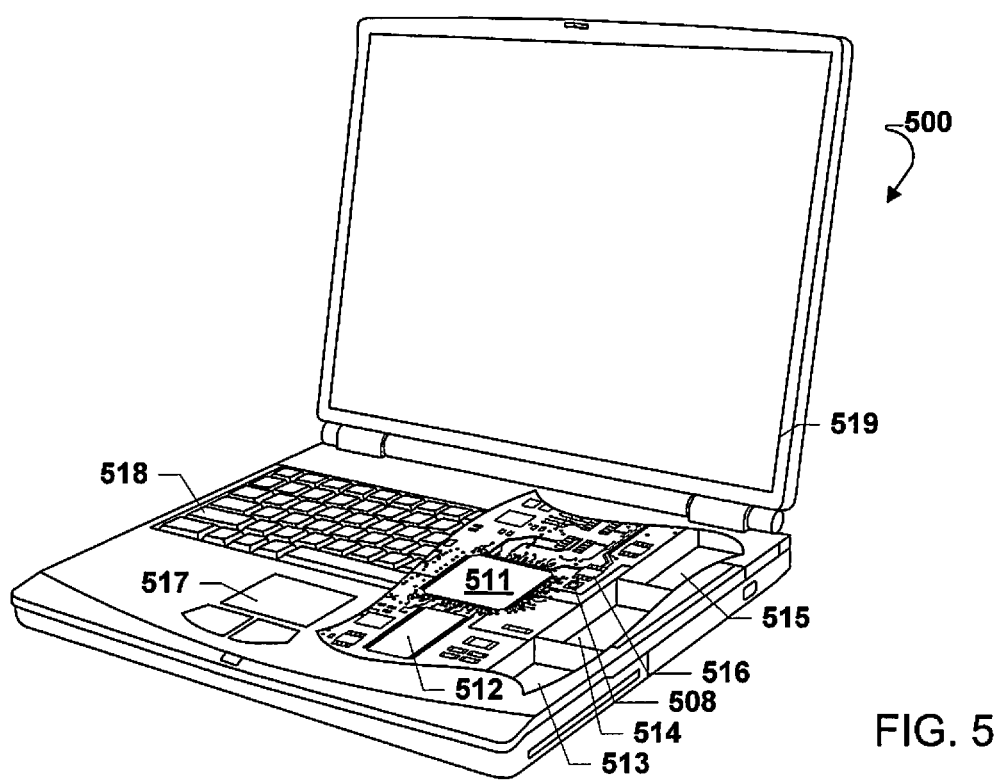
FIG. 5 is a component block diagram of a computing device suitable for use in the various embodiments.

The various embodiments described above may also be implemented within a variety of computing devices, such as a laptop computer 500 illustrated in FIG. 5. Many laptop computers include a touchpad touch surface 517 that serves as the computer's pointing device, and thus may receive drag, scroll, and flick gestures similar to those implemented on mobile computing devices equipped with a touch screen display and described above. A laptop computer 500 will typically include a processor 511 coupled to volatile memory 512 and a large capacity nonvolatile memory, such as a disk drive 513 of Flash memory. Additionally, the computer 500 may have one or more antennas 508 for sending and receiving electromagnetic radiation that may be connected to a wireless data link and/or cellular telephone transceiver 516 coupled to the processor 511. The computer 500 may also include a floppy disc drive 514 and a compact disc (CD) drive 515 coupled to the processor 511. In a notebook configuration, the computer housing includes the touchpad 517, the keyboard 518, and the display 519 all coupled to the processor 511. Other configurations of the mobile computing device may include a computer mouse or trackball coupled to the processor (e.g., via a USB input) as are well known, which may also be use in conjunction with the various embodiments.

Figure 6:
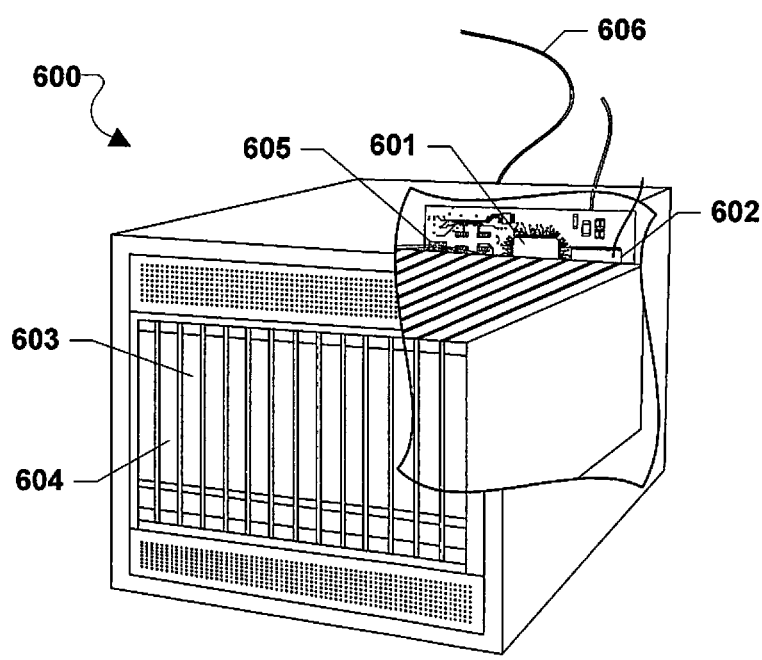
FIG. 6 is a component block diagram of a server suitable for use in the various embodiments.

The various embodiment methods may also be performed partially or completely on a server. Such embodiments may be implemented on any of a variety of commercially available server devices, such as the server 600 illustrated in FIG. 6. Such a server 600 typically includes a processor 601 coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 605 coupled to the processor 601 for establishing data connections with a network 606, such as a local area network coupled to other broadcast system computers and servers. The processor 601 may be any programmable microprocessor, microcomputer or multiple processor chip or chips that can be configured by software instructions (applications) to perform a variety of functions, including the functions of the various embodiments described above. Typically, software applications may be stored in the internal memory 602, 603 before they are accessed and loaded into the processor 601. The processor 601 may include internal memory sufficient to store the application software instructions.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/units discussed here may be implemented in either the kernel space or the user space, unless expressly stated otherwise.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of a satellite control system for solving a detected maneuver for a satellite after entering a recovery mode, comprising:
   determining, by a processor of a computing device of the satellite control system, an initial start time and an initial stop time for the detected maneuver of the satellite;
   generating, by the processor, a recovery maneuver for the satellite based on the initial start time and the initial stop time;
   performing, by the processor, a filtering operation on the recovery maneuver to determine a number of rejected residuals for the recovery maneuver;
   determining, by the processor, whether the number of rejected residuals of the recovery maneuver exceeds a threshold number of rejected residuals;
   performing, by the processor, a smoothing operation on the recovery maneuver to calculate a velocity consistency component for each direction of the recover maneuver in response to determining that the number of rejected residuals of the recovery maneuver does not exceed a threshold;
   determining, by the processor, whether all the calculated velocity consistency components of the recovery maneuver are acceptable after performing the smoothing operation wherein all the calculated velocity consistency components are acceptable when an uncertainty value of the calculated velocity consistency components is at its minimum value; and
   reporting, by the processor, a solution to the recovery maneuver to the satellite control system in response to determining that all the calculated velocity consistency components of the recovery maneuver are acceptable.

2. The method of claim 1, further comprising:
   increasing values the initial start time and the initial stop time of the recovery maneuver by the processor in response to determining that the number of rejected residuals of the recovery maneuver exceeds a threshold number of rejected residuals; and
   repeating the filtering operation by the processor after increasing the values of the initial start time and the initial stop time.

3. The method of claim 1, further comprising:
   determining, by the processor, whether a maximum number of attempts has been tried in response to determining that all the calculated velocity consistency components of the recovery maneuver are not acceptable;
   reporting, by the processor, to the satellite control system that there is no solution to the recovery maneuver in response to determining that the maximum number of attempts has been tried;

adjusting, by the processor, an uncertainty value of the calculated velocity components associated with an unacceptable velocity consistency component for each unacceptable velocity consistency component in response to determining that the maximum number of attempts has not been tried; and repeating the filtering operation by the processor after adjusting an uncertainty value of the calculated velocity components for each unacceptable velocity consistency component.

4. The method of claim 1, wherein determining, by the processor, an initial start time and an initial stop time for the detected maneuver of the satellite comprises:

determining, by the processor, when a residual ratio threshold is exceeded;

identifying, by the processor, a last good time in a data stream;

setting a start time and a stop time of the recovery maneuver by the processor;

performing a filtering operation by the processor on the recovery maneuver to identify a number of rejects;

determining, by the processor, whether the number of rejects exceeds a threshold number of rejects;

determining, by the processor, a period where a thrust is within a threshold of a peak thrust in response to determining that the number of rejects does not exceed the threshold number of rejects; and adjusting, by the processor, the start time and the stop time of the recovery maneuver based on the determined period, wherein tracks of data for the recovery maneuver are part of the data stream.

5. The method of claim 4, further comprising:

setting, by the processor, initial values for thrust or time uncertainties of the recovery maneuver;

determining, by the processor, whether the thrust or time uncertainties are at their maximum values in response to determining that the number of rejects exceeds the threshold number of rejects;

increasing values of the thrust or time uncertainties by the processor in response to determining that the thrust or time uncertainties of the recovery maneuver are not at their maximum values; and repeating the filtering operation by the processor on the recovery maneuver to identify a number of rejects.

6. The method of claim 5, further comprising:

determining, by the processor, whether an analysis start time has been reached in response to determining that the thrust or time uncertainties of the recovery maneuver are at their maximum values;

adjusting the start time of the recovery maneuver by the processor in response to determining that the analysis start time has not been reached;

repeating the filtering operation by the processor after adjusting the start time of the recovery maneuver; and reporting to the satellite control system, by the processor, that no solution exists for the recovery maneuver in response to determining that the analysis start time has been reached.

7. The method of claim 1, wherein determining an initial start time and an initial stop time for the detected maneuver of the satellite comprises:

determining, by the processor, when a residual ratio threshold is exceeded;

identifying, by the processor, a previous track that is separated by a certain number of degrees;

performing, by the processor, a consistency metric test through a stop time of the previous track;

determining, by the processor, whether the previous track passes the consistency metric test; and setting a start time of the recovery maneuver as the stop time of the previous track and setting the stop time of the recovery maneuver as the start time of a track that most recently failed the consistency metric test by the processor in response to determining that the previous track passed the consistency metric test, wherein tracks of data for the recovery maneuver are not part of a data stream.

8. The method of claim 7, further comprising:

determining, by the processor, whether there is another track left to test in response to determining that the previous track did not pass the consistency metric test;

reporting, by the processor, that there is no solution to the recovery maneuver in response to determining that there is no track left to test; and selecting, by the processor, another previous track that is separated by the certain number of degrees from the previous track and repeating the consistency metric test operations based on the another previous track in response to determining that there is a track left to test.

9. The method of claim 1, wherein reporting, by the processor, a solution to the recovery maneuver to the satellite control system comprises:

minimizing, by the processor, one or more uncertainty values of the calculated velocity consistency components of the recovery maneuver to determine a final solution for the recovery maneuver;

computing, by the processor, an objective function value of the final solution; and reporting, by the processor to the satellite control system, the objective function value of the final solution.

10. A method of a satellite control system for solving a detected maneuver after entering a recovery mode, comprising:

determining, by a processor of a computing device of the satellite control system, an initial start time and an initial stop time for the detected maneuver of the satellite;

generating, by the processor, a recovery maneuver for the satellite based on the initial start time and the initial stop time;

performing, by the processor, a filtering operation on the recovery maneuver to determine a number of rejected residuals for the recovery maneuver;

determining, by the processor, whether the number of rejected residuals exceeds a threshold number of rejected residuals;

performing, by the processor, a smoothing operation on the recovery maneuver to compute a velocity consistency component for each direction component of the recovery maneuver in response to determining that the number of rejected residuals does not exceed a threshold number of rejected residuals;

determining, by the processor, whether each velocity consistency component of the recovery maneuver is within a certain tolerance threshold for velocity;

adjusting, by the processor, values of one or more velocity uncertainties associated with a velocity consistency component that is not within the certain tolerance threshold for velocity in response to determining that a velocity consistency component is not within the certain tolerance threshold for velocity;

repeating the filtering operation by the processor;

determining, by the processor, whether the number of rejected residuals exceeds the threshold number of rejected residuals after repeating the filtering operation;

repeating the smoothing operation by the processor in response to determining that the number of rejected residuals does not exceed the threshold number of rejected residuals;

determining, by the processor, whether each velocity consistency component of the recovery maneuver is within the certain tolerance threshold after repeating the smoothing operation; and reporting, by the processor, a solution to the recovery maneuver to the satellite control system in response to determining that all velocity consistency components of the recovery maneuver are acceptable after repeating the smoothing operation.

11. The method of claim 10, further comprising:

determining, by the processor, whether a maximum number of iterations has been reached in response to determining that the number of rejected residuals exceeds the threshold number of rejected residuals;

extending, by the processor, the recovery maneuver in response to determining that the maximum number of iterations has been reached; and adjusting, by the processor, values of one or more velocity uncertainties of the recovery maneuver in response to determining that the maximum number of iterations has not been reached.

12. The method of claim 10, further comprising:

determining, by the processor, whether a maximum number of iterations of the filtering operation has been performed in response to determining that the number of rejected residuals exceeds the threshold number of rejected residuals after repeating the filtering operation;

extending, by the processor, the recovery maneuver in response to determining that the maximum number of iterations of the filtering operation has been performed after repeating the filtering operation; and halving, by the processor, a step in the velocity uncertainties in response to determining that the maximum number of iterations of the filtering operation has not been performed after repeating the filtering operation; and determining, by the processor, that the number of rejected residuals exceeds the threshold number of rejected residuals.

13. The method of claim 10, further comprising:

determining, by the processor, whether a maximum number of iterations of the smoothing operation has been performed in response to determining that each velocity consistency component of the recovery maneuver is not within the certain tolerance threshold for velocity after repeating the smoothing operation;

extending, by the processor, the recovery maneuver in response to determining that the maximum number of iterations of the smoothing operation has been performed after repeating the smoothing operation; and adjusting, by the processor, values of one or more velocity uncertainties for the recovery maneuver in response to determining that the maximum number of iterations of the smoothing operation has been performed after repeating the smoothing operation.

14. A non-transitory processor readable medium having stored thereon processor executable instructions configured to cause a processor of a computing device of a satellite control system to perform operations comprising:

determining an initial start time and an initial stop time for the detected maneuver of a satellite;

generating a recovery maneuver for the satellite based on the initial start time and the initial stop time;

performing a filtering operation on the recovery maneuver to determine a number of rejected residuals for the recovery maneuver;

determining whether the number of rejected residuals of the recovery maneuver exceeds a threshold number of rejected residuals;

performing a smoothing operation on the recovery maneuver to calculate a velocity consistency component for each direction of the recover maneuver in response to determining that the number of rejected residuals of the recovery maneuver does not exceed a threshold;

determining whether all the calculated velocity consistency components of the recovery maneuver are acceptable after performing the smoothing operation, wherein all the calculated velocity consistency components are acceptable when an uncertainty value of the calculated velocity consistency components is at its minimum value; and reporting a solution to the recovery maneuver to the satellite control system in response to determining that all the calculated velocity consistency components of the recovery maneuver are acceptable.

15. The non-transitory processor readable medium of claim 14, wherein the stored processor executable instructions are configured to cause a processor of a computing device of a satellite control system to perform operations further comprising:

increasing values the initial start time and the initial stop time of the recovery maneuver by the processor in response to determining that the number of rejected residuals of the recovery maneuver exceeds a threshold number of rejected residuals; and repeating the filtering operation by the processor after increasing the values of the initial start time and the initial stop time.

16. The non-transitory processor readable medium of claim 14, wherein the stored processor executable instructions are configured to cause a processor of a computing device of a satellite control system to perform operations further comprising:

determining whether a maximum number of attempts has been tried in response to determining that all the calculated velocity consistency components of the recovery maneuver are not acceptable;

reporting to the satellite control system that there is no solution to the recovery maneuver in response to determining that the maximum number of attempts has been tried;

adjusting an uncertainty value of the calculated velocity components associated with an unacceptable velocity consistency component for each unacceptable velocity consistency component in response to determining that the maximum number of attempts has not been tried; and repeating the filtering operation by the processor after adjusting an uncertainty value of the calculated velocity components for each unacceptable velocity consistency component.

17. The non-transitory processor readable medium of claim 14, wherein the stored processor executable instructions are configured to cause a processor of a computing device of a satellite control system to perform operations such that determining an initial start time and an initial stop time for the detected maneuver of the satellite comprises:
  determining when a residual ratio threshold is exceeded;
  identifying a last good time in a data stream;
  setting a start time and a stop time of the recovery maneuver;
  performing a filtering operation on the recovery maneuver to identify a number of rejects;
  determining whether the number of rejects exceeds a threshold number of rejects;
  determining a period where a thrust is within a threshold of a peak thrust in response to determining that the number of rejects does not exceed the threshold number of rejects; and
  adjusting the start time and the stop time of the recovery maneuver based on the determined period,
  wherein tracks of data for the recovery maneuver are part of the data stream.

18. The non-transitory processor readable medium of claim 17, wherein the stored processor executable instructions are configured to cause a processor of a computing device of a satellite control system to perform operations further comprising:
  setting initial values for thrust or time uncertainties of the recovery maneuver;
  determining whether the thrust or time uncertainties are at their maximum values in response to determining that the number of rejects exceeds the threshold number of rejects;
  increasing values of the thrust or time uncertainties by the processor in response to determining that the thrust or time uncertainties of the recovery maneuver are not at their maximum values; and
  repeating the filtering operation by the processor on the recovery maneuver to identify a number of rejects.

19. The non-transitory processor readable medium of claim 18, wherein the stored processor executable instructions are configured to cause a processor of a computing device of a satellite control system to perform operations further comprising:
  determining whether an analysis start time has been reached in response to determining that the thrust or time uncertainties of the recovery maneuver are at their maximum values;
  adjusting the start time of the recovery maneuver in response to determining that the analysis start time has not been reached;
  repeating the filtering operation after adjusting the start time of the recovery maneuver; and
  reporting to the satellite control system that no solution exists for the recovery maneuver in response to determining that the analysis start time has been reached.

20. The non-transitory processor readable medium of claim 14, wherein the stored processor executable instructions are configured to cause a processor of a computing device of a satellite control system to perform operations such that determining an initial start time and an initial stop time for the detected maneuver of the satellite comprises:
  determining when a residual ratio threshold is exceeded;
  identifying a previous track that is separated by a certain number of degrees;
  performing a consistency metric test through a stop time of the previous track;
  determining whether the previous track passes the consistency metric test; and
  setting a start time of the recovery maneuver as the stop time of the previous track and setting the stop time of the recovery maneuver as the start time of a track that most recently failed the consistency metric test in response to determining that the previous track passed the consistency metric test,
  wherein tracks of data for the recovery maneuver are not part of a data stream.

21. The non-transitory processor readable medium of claim 20, wherein the stored processor executable instructions are configured to cause a processor of a computing device of a satellite control system to perform operations further comprising:
  determining whether there is another track left to test in response to determining that the previous track did not pass the consistency metric test;
  reporting that there is no solution to the recovery maneuver in response to determining that there is no track left to test; and
  selecting another previous track that is separated by the certain number of degrees from the previous track and repeating the consistency metric test operations based on the another previous track in response to determining that there is a track left to test.

22. The non-transitory processor readable medium of claim 14, wherein the stored processor executable instructions are configured to cause a processor of a computing device of a satellite control system to perform operations such that reporting a solution to the recovery maneuver to the satellite control system comprises:
  minimizing one or more uncertainty values of the calculated velocity consistency components of the recovery maneuver to determine a final solution for the recovery maneuver;
  computing an objective function value of the final solution; and
  reporting to the satellite control system the objective function value of the final solution.

23. A non-transitory processor readable medium having stored thereon processor executable instructions configured to cause a processor of a computing device of a satellite control system to perform operations comprising:
  determining an initial start time and an initial stop time for the detected maneuver of a satellite;
  generating a recovery maneuver for the satellite based on the initial start time and the initial stop time;
  performing a filtering operation on the recovery maneuver to determine a number of rejected residuals for the recovery maneuver;
  determining whether the number of rejected residuals exceeds a threshold number of rejected residuals;
  performing a smoothing operation on the recovery maneuver to compute a velocity consistency component for each direction component of the recovery maneuver in response to determining that the number of rejected residuals does not exceed a threshold number of rejected residuals;
  determining whether each velocity consistency component of the recovery maneuver is within a certain tolerance threshold for velocity;
  adjusting values of one or more velocity uncertainties associated with a velocity consistency component that is not within the certain tolerance threshold for velocity in response to determining that a velocity consistency component is not within the certain tolerance threshold for velocity;
  repeating the filtering operation;

determining whether the number of rejected residuals exceeds the threshold number of rejected residuals after repeating the filtering operation;

repeating the smoothing operation by the processor in response to determining that the number of rejected residuals does not exceed the threshold number of rejected residuals;

determining whether each velocity consistency component of the recovery maneuver is within the certain tolerance threshold after repeating the smoothing operation; and reporting a solution to the recovery maneuver to the satellite control system in response to determining that all velocity consistency components of the recovery maneuver are acceptable after repeating the smoothing operation.

24. The non-transitory processor readable medium of claim 23, wherein the stored processor executable instructions are configured to cause a processor of a computing device of a satellite control system to perform operations further comprising:

determining whether a maximum number of iterations has been reached in response to determining that the number of rejected residuals exceeds the threshold number of rejected residuals;

extending the recovery maneuver in response to determining that the maximum number of iterations has been reached; and adjusting values of one or more velocity uncertainties of the recovery maneuver in response to determining that the maximum number of iterations has not been reached.

25. The non-transitory processor readable medium of claim 23, wherein the stored processor executable instructions are configured to cause a processor of a computing device of a satellite control system to perform operations further comprising:

determining whether a maximum number of iterations of the filtering operation has been performed in response to determining that the number of rejected residuals exceeds the threshold number of rejected residuals after repeating the filtering operation;

extending the recovery maneuver in response to determining that the maximum number of iterations of the filtering operation has been performed after repeating the filtering operation;

halving a step in the velocity uncertainties in response to determining that the maximum number of iterations of the filtering operation has not been performed after repeating the filtering operation; and determining that the number of rejected residuals exceeds the threshold number of rejected residuals.

26. The non-transitory processor readable medium of claim 23, wherein the stored processor executable instructions are configured to cause a processor of a computing device of a satellite control system to perform operations further comprising:

determining whether a maximum number of iterations of the smoothing operation has been performed in response to determining that each velocity consistency component of the recovery maneuver is not within the certain tolerance threshold for velocity after repeating the smoothing operation;

extending the recovery maneuver in response to determining that the maximum number of iterations of the smoothing operation has been performed after repeating the smoothing operation; and adjusting values of one or more velocity uncertainties for the recovery maneuver in response to determining that the maximum number of iterations of the smoothing operation has been performed after repeating the smoothing operation.

27. A computing device of a satellite control system for solving a detected maneuver for a satellite after entering a recovery mode, comprising:

a processor configured with processor executable instructions to perform operations comprising:

determining an initial start time and an initial stop time for the detected maneuver of a satellite;

generating a recovery maneuver for the satellite based on the initial start time and the initial stop time;

performing a filtering operation on the recovery maneuver to determine a number of rejected residuals for the recovery maneuver;

determining whether the number of rejected residuals of the recovery maneuver exceeds a threshold number of rejected residuals;

performing a smoothing operation on the recovery maneuver to calculate a velocity consistency component for each direction of the recover maneuver in response to determining that the number of rejected residuals of the recovery maneuver does not exceed a threshold;

determining whether all the calculated velocity consistency components of the recovery maneuver are acceptable after performing the smoothing operation, wherein all the calculated velocity consistency components are acceptable when an uncertainty value of the calculated velocity consistency components is at its minimum value; and reporting a solution to the recovery maneuver to the satellite control system in response to determining that all the calculated velocity consistency components of the recovery maneuver are acceptable.

28. The computing device of claim 27, wherein the processor is configured with processor executable instructions to perform operations further comprising:

increasing values the initial start time and the initial stop time of the recovery maneuver by the processor in response to determining that the number of rejected residuals of the recovery maneuver exceeds a threshold number of rejected residuals; and repeating the filtering operation by the processor after increasing the values of the initial start time and the initial stop time.

29. The computing device of claim 27, wherein the processor is configured with processor executable instructions to perform operations further comprising:

determining whether a maximum number of attempts has been tried in response to determining that all the calculated velocity consistency components of the recovery maneuver are not acceptable;

reporting to the satellite control system that there is no solution to the recovery maneuver in response to determining that the maximum number of attempts has been tried;

adjusting an uncertainty value of the calculated velocity components associated with an unacceptable velocity consistency component for each unacceptable velocity consistency component in response to determining that the maximum number of attempts has not been tried; and repeating the filtering operation by the processor after adjusting an uncertainty value of the calculated velocity components for each unacceptable velocity consistency component.

30. The computing device of claim 27, wherein the processor is configured with processor executable instructions to perform operations such that determining an initial start time and an initial stop time for the detected maneuver of the satellite comprises:
  determining when a residual ratio threshold is exceeded;
  identifying a last good time in a data stream;
  setting a start time and a stop time of the recovery maneuver;
  performing a filtering operation on the recovery maneuver to identify a number of rejects;
  determining whether the number of rejects exceeds a threshold number of rejects;
  determining a period where a thrust is within a threshold of a peak thrust in response to determining that the number of rejects does not exceed the threshold number of rejects; and
  adjusting the start time and the stop time of the recovery maneuver based on the determined period,
  wherein tracks of data for the recovery maneuver are part of the data stream.

31. The computing device of claim 30, wherein the processor is configured with processor executable instructions to perform operations further comprising:
  setting initial values for thrust or time uncertainties of the recovery maneuver;
  determining whether the thrust or time uncertainties are at their maximum values in response to determining that the number of rejects exceeds the threshold number of rejects;
  increasing values of the thrust or time uncertainties by the processor in response to determining that the thrust or time uncertainties of the recovery maneuver are not at their maximum values; and
  repeating the filtering operation by the processor on the recovery maneuver to identify a number of rejects.

32. The computing device of claim 31, wherein the processor is configured with processor executable instructions to perform operations further comprising:
  determining whether an analysis start time has been reached in response to determining that the thrust or time uncertainties of the recovery maneuver are at their maximum values;
  adjusting the start time of the recovery maneuver in response to determining that the analysis start time has not been reached;
  repeating the filtering operation after adjusting the start time of the recovery maneuver; and
  reporting to the satellite control system that no solution exists for the recovery maneuver in response to determining that the analysis start time has been reached.

33. The computing device of claim 27, wherein the processor is configured with processor executable instructions to perform operations such that determining an initial start time and an initial stop time for the detected maneuver of the satellite comprises:
  determining when a residual ratio threshold is exceeded;
  identifying a previous track that is separated by a certain number of degrees;
  performing a consistency metric test through a stop time of the previous track;
  determining whether the previous track passes the consistency metric test; and
  setting a start time of the recovery maneuver as the stop time of the previous track and setting the stop time of the recovery maneuver as the start time of a track that most recently failed the consistency metric test in response to determining that the previous track passed the consistency metric test,
  wherein tracks of data for the recovery maneuver are not part of a data stream.

34. The computing device of claim 33, wherein the processor is configured with processor executable instructions to perform operations further comprising:
  determining whether there is another track left to test in response to determining that the previous track did not pass the consistency metric test;
  reporting that there is no solution to the recovery maneuver in response to determining that there is no track left to test; and
  selecting another previous track that is separated by the certain number of degrees from the previous track and repeating the consistency metric test operations based on the another previous track in response to determining that there is a track left to test.

35. The computing device of claim 27, wherein the processor is configured with processor executable instructions to perform operations such that reporting a solution to the recovery maneuver to the satellite control system comprises:
  minimizing one or more uncertainty values of the calculated velocity consistency components of the recovery maneuver to determine a final solution for the recovery maneuver;
  computing an objective function value of the final solution; and
  reporting to the satellite control system the objective function value of the final solution.

36. A computing device of a satellite control system for solving a detected maneuver for a satellite after entering a recovery mode, comprising:
  a processor configured with processor executable instructions to perform operations comprising:
    an initial start time and an initial stop time for the detected maneuver of a satellite;
    generating a recovery maneuver for the satellite based on the initial start time and the initial stop time;
    performing a filtering operation on the recovery maneuver to determine a number of rejected residuals for the recovery maneuver;
    determining whether the number of rejected residuals exceeds a threshold number of rejected residuals;
    performing a smoothing operation on the recovery maneuver to compute a velocity consistency component for each direction component of the recovery maneuver in response to determining that the number of rejected residuals does not exceed a threshold number of rejected residuals;
    determining whether each velocity consistency component of the recovery maneuver is within a certain tolerance threshold for velocity;
    adjusting values of one or more velocity uncertainties associated with a velocity consistency component that is not within the certain tolerance threshold for velocity in response to determining that a velocity consistency component is not within the certain tolerance threshold for velocity;
    repeating the filtering operation;

determining whether the number of rejected residuals exceeds the threshold number of rejected residuals after repeating the filtering operation;

repeating the smoothing operation by the processor in response to determining that the number of rejected residuals does not exceed the threshold number of rejected residuals;

determining whether each velocity consistency component of the recovery maneuver is within the certain tolerance threshold after repeating the smoothing operation; and reporting a solution to the recovery maneuver to the satellite control system in response to determining that all velocity consistency components of the recovery maneuver are acceptable after repeating the smoothing operation.

37. The computing device of claim 36, wherein the processor is configured with processor executable instructions to perform operations further comprising:

determining whether a maximum number of iterations has been reached in response to determining that the number of rejected residuals exceeds the threshold number of rejected residuals;

extending the recovery maneuver in response to determining that the maximum number of iterations has been reached; and adjusting values of one or more velocity uncertainties of the recovery maneuver in response to determining that the maximum number of iterations has not been reached.

38. The computing device of claim 36, wherein the processor is configured with processor executable instructions to perform operations further comprising:

determining whether a maximum number of iterations of the filtering operation has been performed in response to determining that the number of rejected residuals exceeds the threshold number of rejected residuals after repeating the filtering operation;

extending the recovery maneuver in response to determining that the maximum number of iterations of the filtering operation has been performed after repeating the filtering operation;

halving a step in the velocity uncertainties in response to determining that the maximum number of iterations of the filtering operation has not been performed after repeating the filtering operation; and determining that the number of rejected residuals exceeds the threshold number of rejected residuals.

39. The computing device of claim 36, wherein the processor is configured with processor executable instructions to perform operations further comprising:

determining whether a maximum number of iterations of the smoothing operation has been performed in response to determining that each velocity consistency component of the recovery maneuver is not within the certain tolerance threshold for velocity after repeating the smoothing operation;

extending the recovery maneuver in response to determining that the maximum number of iterations of the smoothing operation has been performed after repeating the smoothing operation; and adjusting values of one or more velocity uncertainties for the recovery maneuver in response to determining that the maximum number of iterations of the smoothing operation has been performed after repeating the smoothing operation.

* * * * *